United States Patent [19]

Fitch

[11] Patent Number: 4,807,225
[45] Date of Patent: Feb. 21, 1989

[54] TELEPHONE LINE CARRIER SYSTEM

[75] Inventor: Richard C. Fitch, Noblesville, Ind.

[73] Assignee: American Telephone and Telegraph Company, AT&T Technologies, Inc., Berkeley Heights, N.J.

[21] Appl. No.: 10,248

[22] Filed: Feb. 2, 1987

[51] Int. Cl.$^4$ ............................ H04J 1/02; H04J 1/14
[52] U.S. Cl. ..................................... 370/71; 370/69.1; 370/76
[58] Field of Search ............... 370/71, 72, 73, 76, 370/69.1, 124

[56] References Cited

U.S. PATENT DOCUMENTS

| | | | |
|---|---|---|---|
| 2,535,446 | 6/1942 | Mitchell | 175/2.5 |
| 3,475,561 | 10/1969 | Krasin et al. | 370/71 |
| 3,573,379 | 4/1971 | Schmitz et al. | 179/15 |
| 3,639,692 | 2/1972 | Krasin et al. | 370/71 |
| 3,949,172 | 4/1976 | Brown et al. | 179/2.5 |
| 4,049,914 | 9/1977 | Anderson et al. | 179/2.5 |
| 4,196,317 | 4/1980 | Bartelink | 179/37 |
| 4,262,171 | 4/1981 | Schneider et al. | 370/71 |
| 4,449,218 | 5/1984 | Strehl | 370/76 |
| 4,578,540 | 3/1986 | Borg et al. | 179/2 A |

OTHER PUBLICATIONS

"High-Frequency Data Transmission over Urban Telephone Networks" by Divnogortsev in Telecommun. & Radio Eng. Pt. 1 (USA), vol. 26, No. 6 (Jun. 1972) pp. 40-2 to 42.

"MCD Aids Small Phone Systems", *Electronic Engineering Times*, Warren Andrews, 3/10/86, p. 44.

Primary Examiner—Douglas W. Olms
Attorney, Agent, or Firm—Michael A. Morra

[57] ABSTRACT

A telephone line carrier system comprising a master station (221) and one or more remote stations (222) is disclosed. Each station (221, 222) is bridged, in a parallel electrical connection, onto a wire-pair (201) that extends from the station to a telephone line switching system. Each station (221, 222) includes a line interface (110, 310) for connecting to the wire-pair (201) at voice-band frequencies, and a radio frequency interface (700, 800) for connecting to the wire-pair (201) at Radio Frequencies (RF). Each station further includes multiplexer and demultiplexer equipment (500, 600) for frequency shifting voice and data channels between base-band and RF. Frequency modulation and full duplex transmission are used for voice communication while amplitude modulation and half-duplex transmission are used for data communication. The master station (221) terminates a second telephone line (202) and frequency multiplexes/demultiplexes signals between the second telephone line (202) and the wire-pair (201) thereby providing remote stations with access to the second line. Telephone status and control information, including ringing and answer control, are exchanged between controllers (160, 360) via the data channel.

19 Claims, 9 Drawing Sheets

TELEPHONE LINE CARRIER SYSTEM

FIELD OF THE INVENTION

The present invention relates to a frequency division multiplex system and more particularly to apparatus that adds communication channels to a telephone wire-pair at a business or residential location.

BACKGROUND OF THE INVENTION

It has become increasingly desirable in our communications-oriented society to upgrade and improve business and residential telephone equipment to add certain new features and services. Such features include: a second telephone line for a teenager, a co-worker, or a computer terminal; an intercom system for paging and monitoring; and the distribution of music or other information among a group of users at a particular location. However, since one cannot expect to find more than a single wire-pair at any given location, it is frequently necessary to supply additional wiring beyond the single wire-pair used for basic telephone service in order to increase the number of communication channels. Costs associated with adding or relocating wires can be significant. Furthermore, many commercially available systems that are used to increase information distribution capacity are incompatible with existing telephone equipment, so a user's investment is immediately eroded.

From a convenience standpoint, it is desirable for a customer to merely purchase a telephone product, take it home, and plug it into an existing telephone jack. Many systems that utilize the local telephone wire-pair at a user's premises require that a master station be placed in a series connection with the incoming wire-pair from the telephone central office. Series connections require that internal wiring be modified which usually means that a telephoen installer or an electrician needs to be hired. Series connections also have the drawback that the master station cannot be located at any telephone jack. Since the master station terinates the incoming wire-pair, it is typically located at the protector block or the telephone jack nearest to it. Relocating a master station presents difficulties because the connection must be electrically maintained at one point while the station is physically moved to another. Finally, even when the master station is compatible with existing telephone sets, should the master malfunction, series connected equipment is likely to malfunction as well.

It is therefore an object of the present invention to provide telephone apparatus that creates additional communication channels at a business or residential premises and is compatible with existing telephone extensions that share a common wire-pair.

It is another object of the invention to provide apparatus that combines signals from a first incoming telephone line with signals from a second incoming telephone line and distributes the combined signals over a single wire-pair.

It is yet another object of the invention to provide telephone apparatus, including a master and one or more remote stations, that plugs into any available telephone jack at the user's premises; and, should the master or remote station malfunction, not cause other connected equipment to malfunction.

SUMMARY OF THE INVENTION

The Telephone Line Carrier System of the present invention overcomes the problems and limitations of commercially available systems that seek to enhance inter-and intra-premises communications. The System comprises a master telephone station and one or more remote telephone stations that are bridged onto a single wire-pair at a user's business or residential location in a parallel electrical connection. These customer installable stations are merely plugged into any telephone jack and share a telephone wire-pair with existing telephone extensions without interference. Both master and remote stations operate similar to conventional telephone extensions. The term "extension", as used herein, denotes a standard telephone set that can only access an audio frequency telephone channel (typically below 4kHz). The term "station," as used herein, denotes a telephone set according to the invention that includes frequency multiplexing and demultiplexing equipment used to create additional communications channels and a data channel at frequencies that do not interfere with telephone extensions already present on the wire-pair. Communications channels are used to distribute intercom and additional telephone line signals while the data channel is used for station control functions such as line status, ringing and hold.

The master station contains electronic circuitry that interacts with a telephone line switching system (e.g., central office, PBX, or key equipment) for dialing, ring detection, and communications over a second telephone line. It frequency multiplexes the second telephone line onto the existing wire-pair at the user's premises for use by remote stations which are equipped with demuliplexers. Additionally, it exchanges control signals with each remote station via the frequency multiplexed data channel.

It is a feature of the present invention that the master and each remote station includes a hybrid circuit for accessing the baseband channel used for standard telephone service.

It is another feature of the invention that the data channel uses on/off carrier keying and a common channel for transmitting and receiving information.

These and other objects and features of the Telephone Line Carrier System are discussed in greater detail in the detailed description of the invention, and will be understood more fully when reference is made to the accompanying drawings.

DETAILED DESCRIPTION

The subject Telephone Line Carrier (TLC) System is a "user friendly" enhancement to a residence or business communication system. The TLC comprises a master station and one or more remote stations that plug into any available wall telephone jack and share the intrapremises telephone wire-pair with existing telephone extensions without interference. Each station requires power from a standard 115 volt source. The master and remote stations provide a number of frequency multiplexed channels above the audio frequency channel (below 4 kHz) used for standard telephone service. A rudimentary system having one master and one remote station enhances existing telephone service by providing two more telephone sets that can access the existing telephone line plus add an intercom channel for internal communications between the newly added stations. Of greater significance, however, are the possibilities offered by such a system. Heretofore, individual telephone sets have not been given control over the combination of one or more voice channels and a data channel; and, it is the combination of voice and data channels that yields immense benefits.

Frequency multiplexed voice channels are used to distribute signals from incoming telephone lines as well as music and intercom signals. The data channel controls access to the various voice channels and delivers line status information to all stations. Functions such as energy management, alarm reporting and appliance control are accommodated by the data channel and made available over the existing wire-pair.

Figure 2:
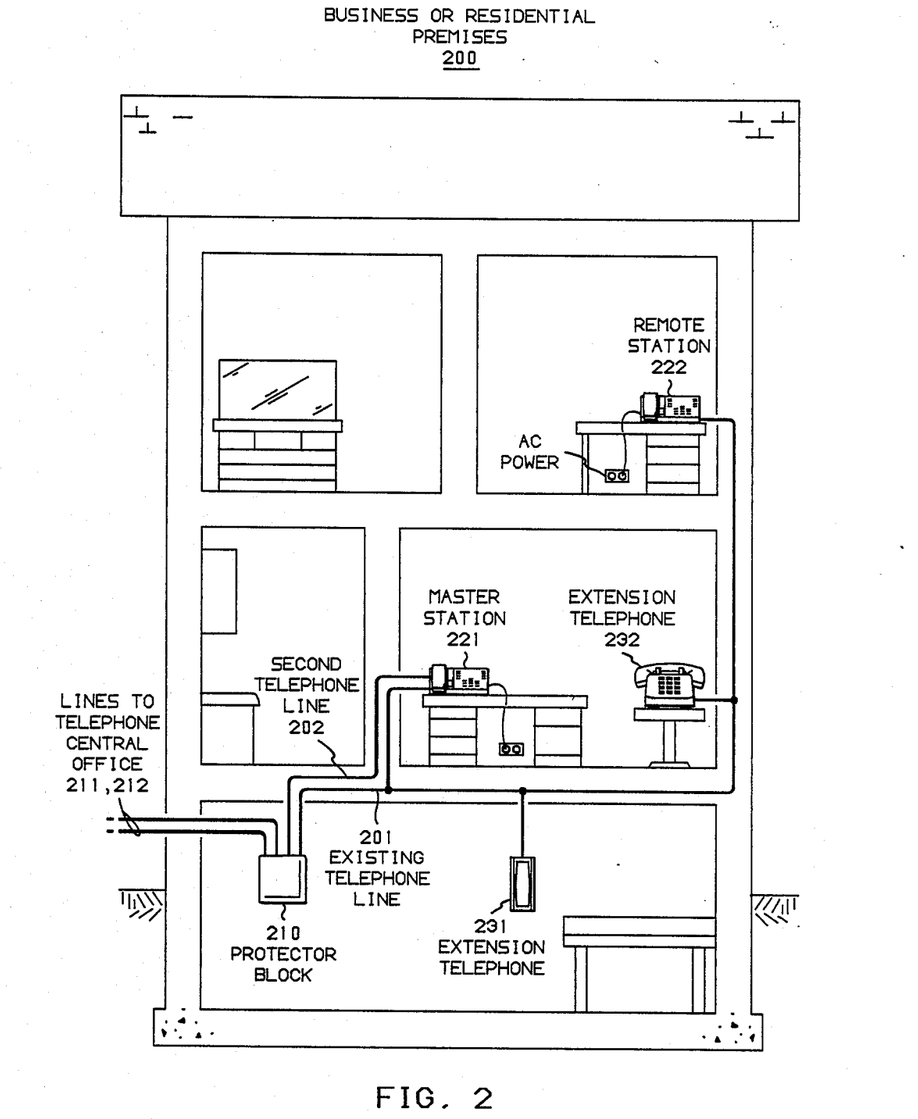
FIG. 2 is a depiction of a customer's premises showing how the present telephone line carrier system may be installed.

FIG. 2 provides a broad view of the TLC System after installation at business or residential premises 200. The System is shown accommodating two independent telephone lines 211, 212 from the telephone line switching system. These lines terminate in protector block 210 which prevents high voltages caused, for example, by lightning from harming people or telephone equipment at premises 200. Prior to the installation of a second telephone line, telephone 231, 232 were the only sets sharing wire pair 201. In accordance with the present invention, master station 221 and remote station 222 are customer installable telephone sets that bridges onto existing telephone wire pair 201. AC power is required at all stations. Stations 221, 222 provide access to Line 1, intercom service between the stations, and a data channel for distributing telephone control information such as line status, keypad activation status, and alerting.

Figure 1:
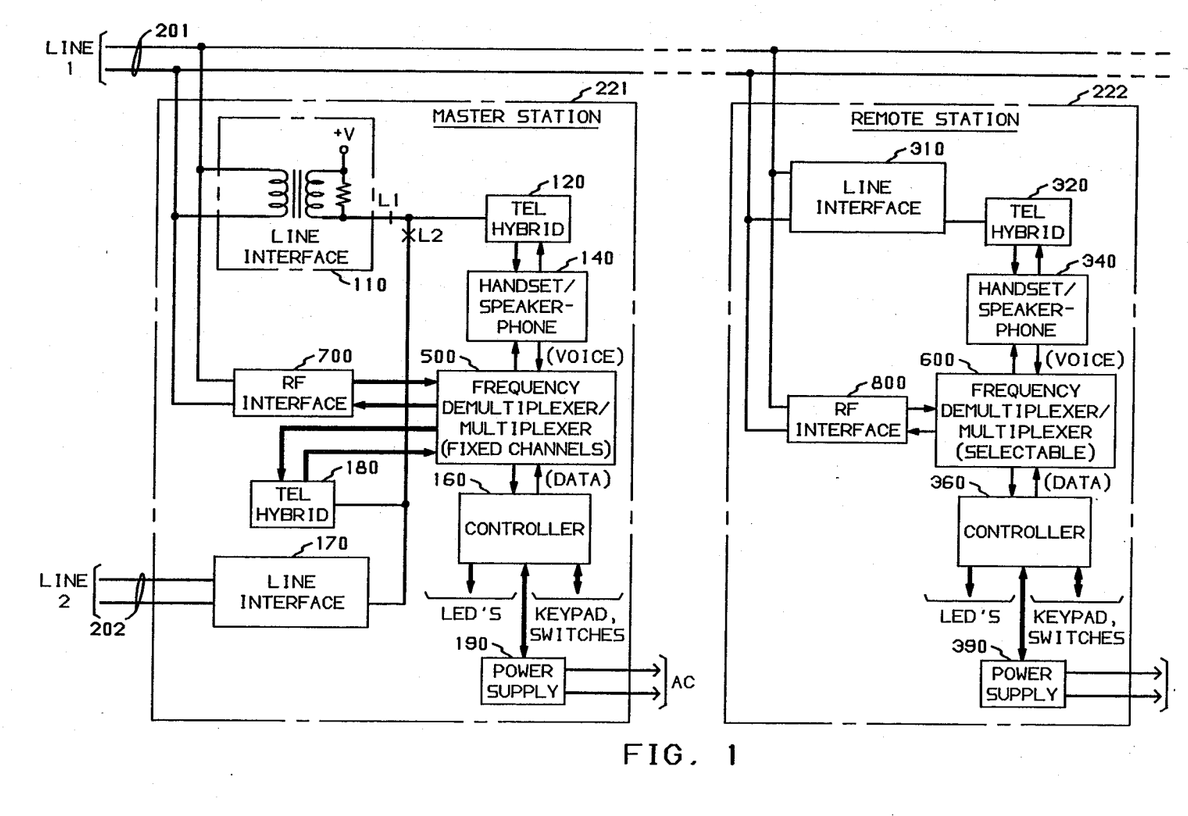
FIG. 1 discloses a block diagram of the telephone line carrier system in accordance with the invention.

A second line 212 from the central office is connected directly to master station 221 over internal wire-pair 202. Master station 221 terminates Line 2 and provides direct access to it at the master station, or frequency multiplexes it onto Line 1 for access by remote station 222. The block diagram description of the Telephone Line Carrier System, shown in FIG. 1, is hereinafter discussed.

Master station 221 bridges onto existing telephone wire-pair 201 in a parallel electrical connection with conventional telephone plugs and jacks. Power to operate the master station is provided by power supply 190 which derives its energy from a 115 V AC source. Line 1 interface 110 includes a ringing detector 11 (see FIG. 4) in parallel with wire-pair 203 and a coupling transformer. Components are selected for operation in the audio frequency range where standard telephone service is offered. Line 1 interface 110 communicates with handset/speakerphone unit 140 through telephone hybrid 120 to deliver incoming speech to a loudspeaker and outgoing speech from a microphone to wire-pair 201. A user may optionally select the handset or speakerphone mode of operation. Master station 221 also converts audio frequency signals associated with handset/speakerphone unit 140 to Radio Frequency (RF) signals for distribution over wire-pair 201. In this regrad, frequency multiplexer/demultiplexer 500 uses frequency modulation for the voice channels and amplitude modulation for the data channel. RF interface 700 is a hybrid circuit whose components are selected for operation at radio frequencies. It operates to interface a four-wire circuit with two-wire telephone line 201. Handset/speakerphone 140 connects to wire-pair 201 through line interface 110 at audio frequencies, or through RF interface 700 at radio frequencies.

In situations where a second telephone line is needed, line interface 170 terminates wire-pair 202 (Line 2), and is functionally equivalent to line interface 110.

MASTER STATION

Figure 4:
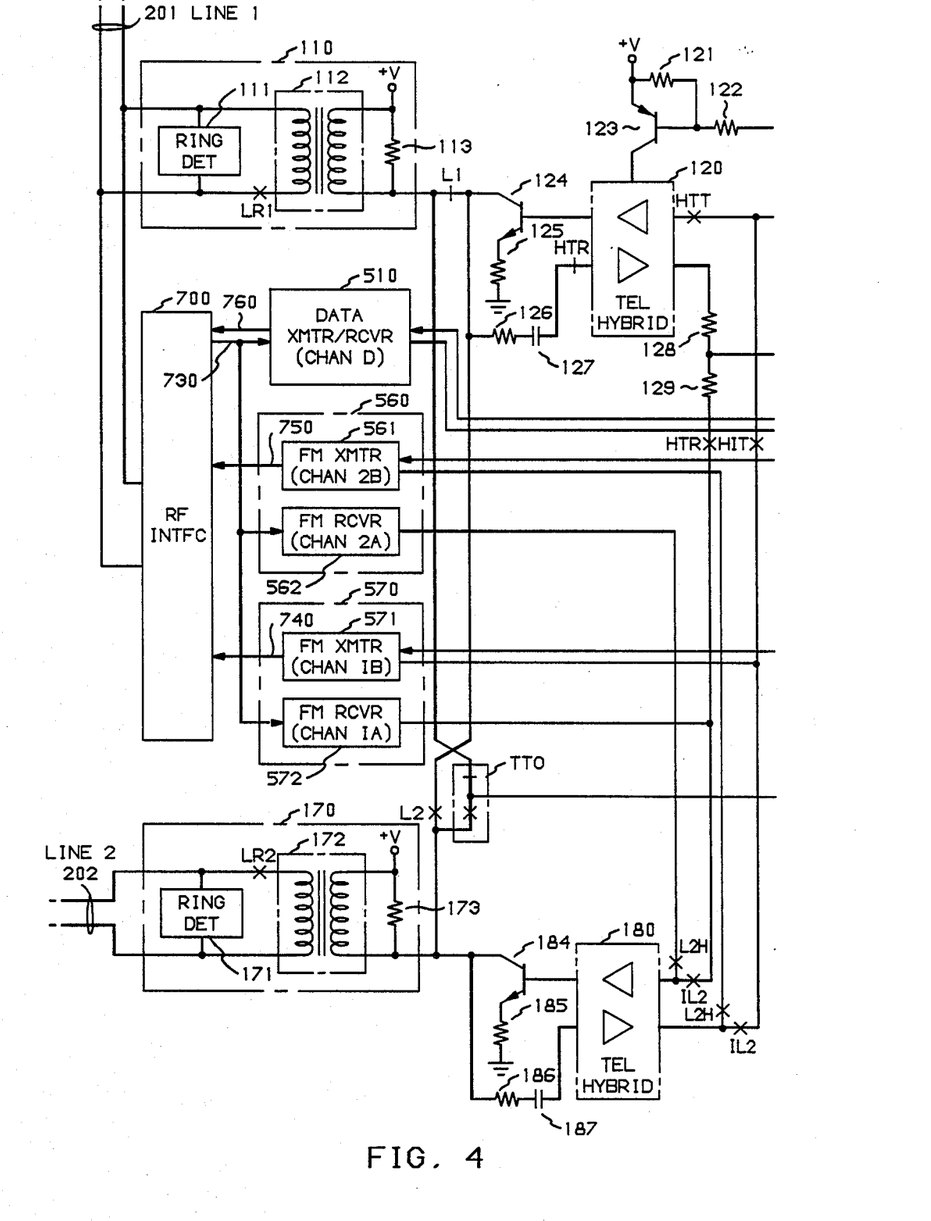
FIGS. 4–5 is an enhanced block diagram of the master station according to the invention.
Figure 5:
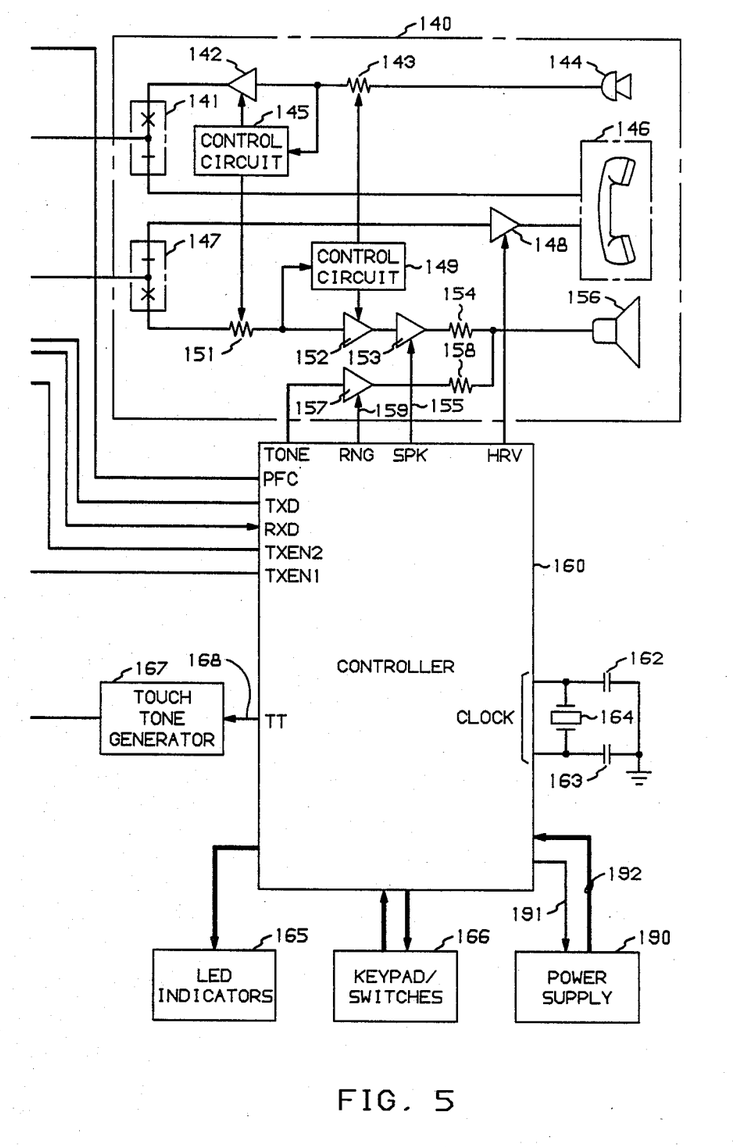

Referring now to FIGS. 4 and 5, wire-pair 201 (Line 1) connects to the master station via line interface 110. Ring detect circuit 111 is responsive to incoming ringing signals and supplies an indication of same to controller 160. Telephone ringing detector circuits are well known and typically comprise a pair of series connected avalanche diodes whose anodes (or cathodes) are tied together. These diodes are in series with a capacitor to eliminate DC. Current flow in the series path is detected by an opto-isolator circuit whose output is electrically remote from high voltage line signals. As example of a commercially available ringing detector circuit is the TCM 1501. Activation of relay contact LR1 completes a DC path on Line 1 such as required for answering. Resistor 113 provides a 600 ohm termination for proper impedance matching;.

Switch L1 is shown in its normal "make" state, thus connecting signals from Line 1 to telephone hybrid 120. Resistor 126 is large compared to 600 ohms so as not to appreciably change the termination impedance regardless of the state of L1. Incoming signals to hybrid 120 pass through resistor 126 and DC isolation capacitor 127. Outgoing signals are buffered by transistor 124 and resistor 125 which provide impedance matching to the line and is functionally similar to an emitter-follower circuit.

Line interface 170, telephone hybrid 180, and components 184–187 are associated with wire-pair 202 (Line 2). These circuits operate in the same manner as the corresponding, above-described circuits that service Line 1. Relay contact L2, when operated, interconnects signals from Line 2 to telephone hybrid 120 and hence to handset/speakerphone 140 thereby allowing the master station user to converse over Line 2. Line 1 and Line 2 are interconnected when relay L2 is energized but relay L1 is not. Conferencing is thereby achieved.

Touch-tone generator 167 includes circuitry for simultaneously generating a pair of tones such as used in conventional touch-tone signaling. Leads 168 from controller 160 select the particular tone pair to be generated in accordance with the particular key depressed in keypad/switch 166. Dual tone multifrequencies signal generators, such as the TP 5088 used in touch-tone signaling, are available in integrated circuit form from a number of manufacturers. An associated crystal operating, for example, at 3.58 MHz provides frequency stability. Signals from touch-tone generator 167 are selectably applied to Line 1 or Line 2 via transfer switch TTO. To prevent these strong signals from annoying the user, controller 160 operates relay switch HTR during touch-tone dialing.

Figure 9:
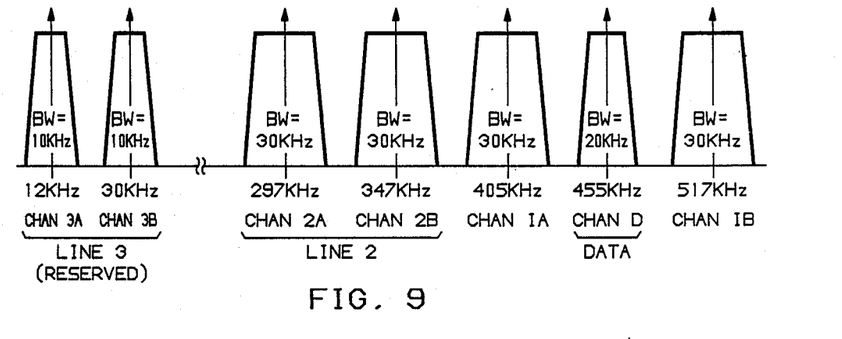
FIG. 9 illustrates the frequency allocation of the radio frequency channels used in the present invention.

Transmission between the various stations in the TLC system proceeds at radio frequencies according to the frequency spectrum allocation set forth in FIG. 9. Data communication takes place in channel D which is centered at 455 kHz. All stations transmit and receive at this frequency using amplitude modulation. Voice communication takes place in control IA, IB, 2A, 2B and 3A, 3B when, for example, a third telpehone line is used. Stations transmit and receive at the frequencies indicated in FIG. 9 using frequency modulation.

VOICE COMMUNICATION

In the preferred embodiment of FIG. 4 the master station includes two pairs of FM transmitters and receivers for communicating with remote stations and bridging them in a conference connection. Each of the FM transmitters and receivers of FIG. 4 operate on fixed pre-assigned channels. Remote stations, on the other hand, have only one FM transmitter and receiver whose operating frequencies are switched between the various ones available depending upon whether the intercom or Line 2 switch is activated, and wheterh the call is being originated or answered at the remote station. The selection of frequencies is discussed in connection with FIG. 8 and is controlled by the state of control leads IRC, IOC and L2C from controller 360 at the remote station.

FM transmitters 561 and 571 operate with a center frequency of 347 kHz and 517 kHz respectively. These transmitters are enabled when signals TXEN2 and TXEN1 are in their low state. Audio signals presented to the FM transmitters are limited at 0.5 V peak to peak and include a pre-emphasis stage, a modulator such as the LM 567, and a buffer stage for interconnection to RF interface 700. Each of the FM receivers 562, 572 includes a buffer amplifier, channel select filter, demodulator such as the LM 567, and a frequency deemphasis circuit. Because of the proximity in frequency between channel IA and channel D, a 455 kHz trap is used in the FM receiver of channel IA. An important specification in the design of an FM transmitter is the modulation index - the ratio of the frequency deviation to the highest modulating frequency. FM transmitters 561, 571 operate with a modulation index of 3.3. Since the FM transmitters are directly coupled to the telephone line, the maximum allowable power is set by Part 68 of the FCC Rules. Energy in the frequency band 270 kHz–6 MHz must be lses than −15 dBv when averaged over a 2 microsecond interval. The design of such FM transmitters and receivers is well known and, given the specifications provided herein, may be readily constructed using conventional circuit design techniques.

DATA COMMUNICATION

The Data Communication channel is designed to be an inexpensive technique for reliable communications in a potentially noisey environment. The communications protocol is implemented in firmware using the controller of the master station and the remote station. The particular controller has integrated hardware for a dual-edge detection vectored interrupt and an event timer with vectored interrupt on overflow. THe data channel uses a half-duplex broadcasting scheme with each station having access to the same channel. To facilitate orderly access to the data channel, all stations look for incoming data before trasmitting. The channel must be idle for 16 ms before attempting to transmit a new message.

Figure 10:
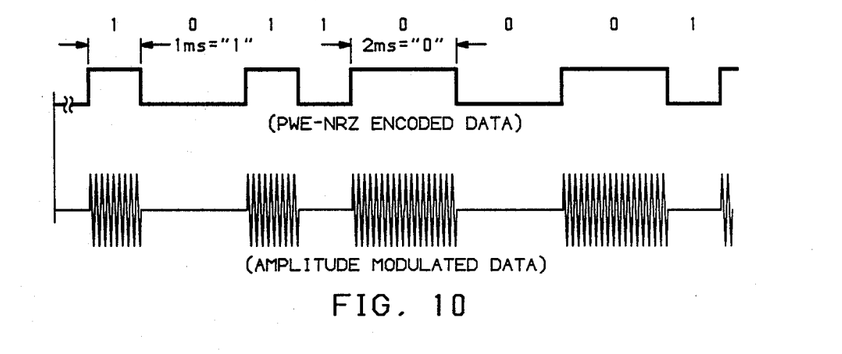
FIG. 10 illustrates various waveforms associated with data transmission using a pulse width encoded - non return to zero format and on/off carrier keying.

The data transmitter is responsive to a binary digital signal for turning a 455 kHz carrier off and on. First, however, the binary digital signal is encoded into a series of pulses having alternating polarity in which a "1" has a duration of 1 ms and a "0" has a duration of 2 ms. Accordingly, if "0" and "1" are equally likely, the nominal signaling rate for the data channel is 667 bits per second. This signaling scheme is known as the Pulse Width Encoded - Non Return to Zero (PWE-NRz) format. The data receiver converts the presence and absence of 455 kHz carrier into discrete levels and thereafter performs appropriate decoding to recover the binary digital signal. FIG. 10 discloses an exemplary binary digital signal (10110001), that is pulse width encoded and thereafter used to amplitude modulate the 455 kHz carrier. Although on/off carrier keying and half-duplex transmission are used in the preferred embodiment of the Data Communication channel, it is clear that other forms of modulation and transmission may be used within the scope of the invention.

Figure 11:
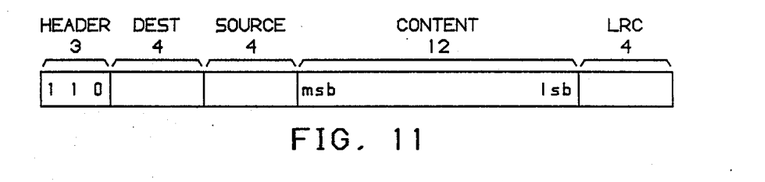
FIG. 11 discloses the telephone line carrier system message packet for the data communications channel.
Figure 12:
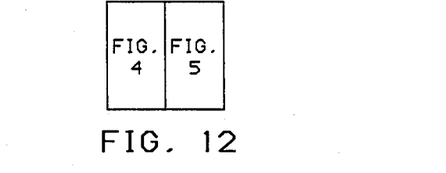
FIG. 12 shows the manner in which FIGS. 4 and 5 interconnect.

FIG. 11 discloses the TLC message packet which is defined to be 27 bits long and broken down into the following fields.

Header: 3 bits, '110' to access the channel and announce the forthcoming message.

Destination: 4 bits, used to identify which receiving stations should consider processing the message. A message can only be processed if the destination address matches that of the station address or if the destination address is '0000', the global addressing value.

Source: 4 bits, identifying the transmitting station. Stations without a programmed address should use '0000'.

Content: 12 bits, containing the informational part of the message. The content may be considered as 3 separate 4 bit fields.

LRC: 4 bits, resulting from a Longitudinal Redundancy Check calculated over the destination, source, and contents.

All fields are transmitted msb first (see FIG. 11). A message packet can range from 32 ms to 48 ms in duration. Incoming messages are examined to see if there have been any transitions on the data channel for 4 ms. If the correct number of bits has been received and the actual LRC matches the calculated LRC, the next 4 ms interval will be dedicated to looking for a negative acknowledgment (NAK) from any other station. In the absence of a NAK, the message is accepted for destination screening and further processing. If a NAK is detected, the message is discarded. A NAK consists of turning carrier ON for a 2 ms interval starting 4 ms after the completion of the message. The absence of carrier for 16 ms is deemed to be the idle state. After 16 ms of idle, any station may start transmitting—so long as another has not. When collision occurs, each of the stations will complete its message to enforce the collision. The result, then, is that the message will surely be garbled and retransmission will be required. A transmission station that has its message NAK's is allowed to retransmit the message after the channel has been idle for 6 ms to 9 ms. The actual time interval is determined by calculating a "pseudo-random" number from 0 to 3 and adding it to the base delay of 6 ms. The need for a randon re-transmission time arises from message collision considerations when two stations transmit at the same time, both calculating idle time from the same event.

DATA TRANSMITTER/RECEIVER

Figure 6:
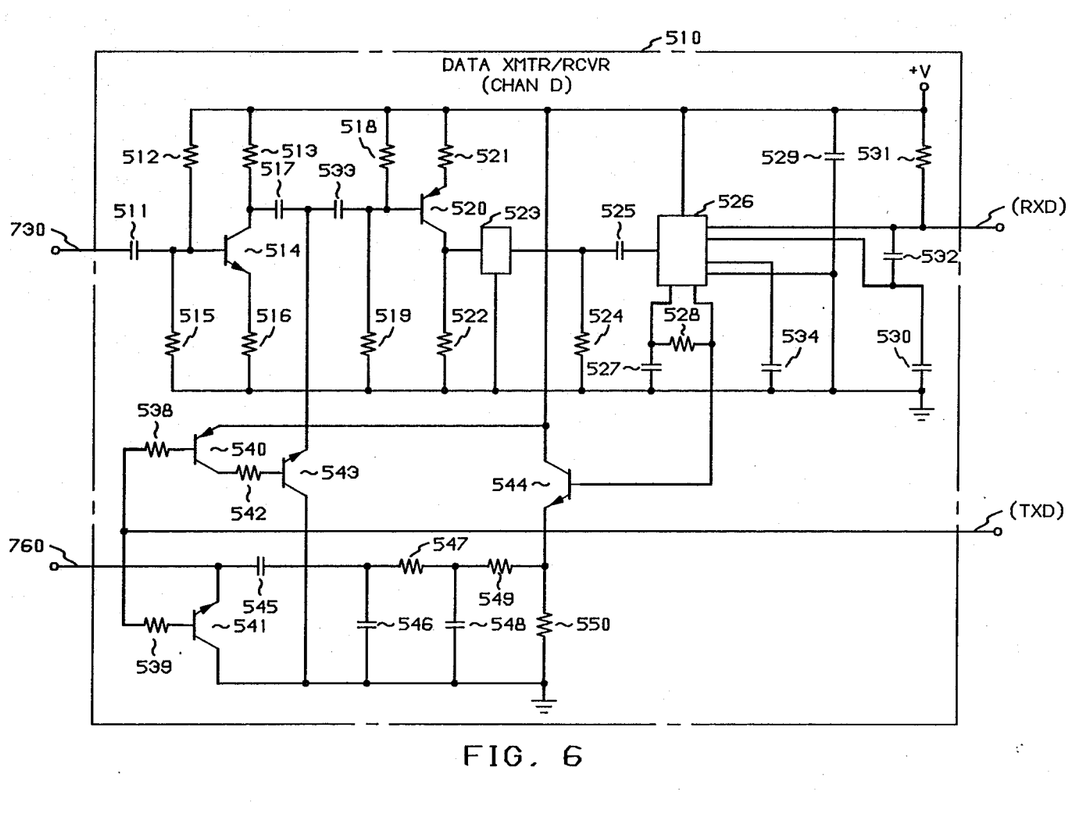
FIG. 6 is a schematic diagram of a data transceiver used in the frequency modulation and demodulation of digital data exchanged between master and remote stations.

FIG. 6 discloses a detailed schematic of data transceiver 510 used in a preferred embodiment of the invention. This transceiver transmits and receives an amplitude modulated 455 kHz carrier wave. A digital data signal, encoded in the PWE-NRz format of FIG. 10 and organized according to the transmission order of FIG. 11, is present on input lead TXD and used to control transistor 541 to turn on and turn off a 455 kHz carrier wave present on output lead 760. The carrier wave is generated by phase-locked loop 526, an output of which is presented to transistor 544, connected in the emitter follower configuration, for driving a filter circuit cimprising components 545–549. The output of phase-locked loop 526 is a square wave at the 455 kHz rate which is filtered to produce a signal with reduced harmonic content at output 760. The center frequency of the phase-locked loop is determined by capacitor 527 and resistor 528. Dual use of component 526 is achieved by "disconnecting" input signals when carrier is being transmitted (i.e., when TXD="0"). Transistors 540 and 543 cooperate to ground the junction between capacitors 517 and 533 and thereby disconnect the input signal from phase-locked loop 526 when TXD="0".

Data transceiver 510 also operates as a receiver of amplitude modulated 455 kHz carriers waves. Input signals are received on lead 730 and amplified by a two-stage transistor circuit comprising components 511–522 and 533. Component 523 is a commercially available four-element ceramic filter having a 35 kHz bandwidth centered at 455 kHz. This amplitude modulated signal. Components 524 and 525 are used in coupling the filtered signal to an input of phase-locked loop 526 for demodulation. The demodulated output signal appears at the junction of resistor 531 and capacitor 532 and is available on output lead RXD. The components directly associated with component 526 are representative of the manufacturer's specifications for this commercially available device which finds use both as a carrier oscillator and as a tone decoder. An acceptable device is the LM 567 tone decoder.

GENERAL CIRCUITS

Referring once again to FIGS. 4 and 5, handset/speakerphone 140 includes circuitry for switching between handset 146 and loudspeaking telephone components including mircophone 144 and loudspeaker 156. Transfer switches 141 and 147 are shown in their deactivated state interconnecting handset 146 with either (i) telephone hybrid 120, (ii) telephone hybrid 180 or (iii) FM transmitter 571 and receiver 572. Amplifier 148 offers two volume levels through controller 160 in response to a volume control switch.

When the speakerphone mode of operation is selected, controller 160 simultaneously activates transfer switches 141 and 147 to disconnect handset 146 from an outgoing line, and connect microphone 144 and loudspeaker 156 in its place. In its quiescent state, the loudspeaking telephone set resides neither in the transmit nor the receive mode. The presence of sufficient transmit signal energy causes the transmit channel gain to increase the receive channel gain to decrease. The presence of sufficient receive signal energy causes the reverse action. The net loop gain of the transmit and receive channels is designed to be less than unity (assuming moderate loss between microphone 144 and loudspeaker 156) in order to avoid oscillation. Loop gain is the same before and after switching to assure maximum gain consistent with stable operation. The transmit channel includes microphone 144, attenuator 143 and amplifier 142. The receive channel principally includes attenuator 151, amplifier 152 and loudspeaker 156. Control circuit 145 is responsive to signal energy in the transmit channel exceeding a predetermined threshold. When the threshold is exceeded, control circuit 145 simultaneously increases both the gain of amplifier 142 and the loss of attenuator 151. Similarly, control circuit 149 is responsive to energy in the receive channel exceeding a predetermined threshold. When the threshold is exceeded, control circuit 149 simultaneously increases both the gain of amplifier 152 and the loss of attenuator 143. In the preferred embodiment, each of the amplifiers and attenuators are arranged to switch 20 dB of gain when activated. By switching only 20 dB in each channel (transmitter and receiver) the time required to "turn around" a speakerphone is minimized and the quality of four-wire transmission is substantially achieved over a two-wire circuit.

Amplifier 153 offers eight different gain settings controllable over lines 155 (3 leads) from the controller. Loudspeaker 156 is also used to provide a modulated 750 Hz for both intercom alerting and normal Line 1 or Line 2 ringing. Amplifier 157 receives an alerting signal from controller 160 which also supplies a signal for selecting between two ringer volume levels over line 159. Resistors 154 and 158 are used to buffer the signals between amplifiers 153, 157 and loudspeaker 156.

Controller 160 is a 4-bit microprocessor having 8K of ROM, such as the NEC 75108, that controls all aspects of the master station in accordance with an internally stored program. A source of stability for clock signals is supplied by resonator 164 and capcitors 162, 163. Resonator 164 is a color burst resonator, such as used in conventional television receivers, having a nominal resonant frequency of 3.58 MHz.

Figure 3:
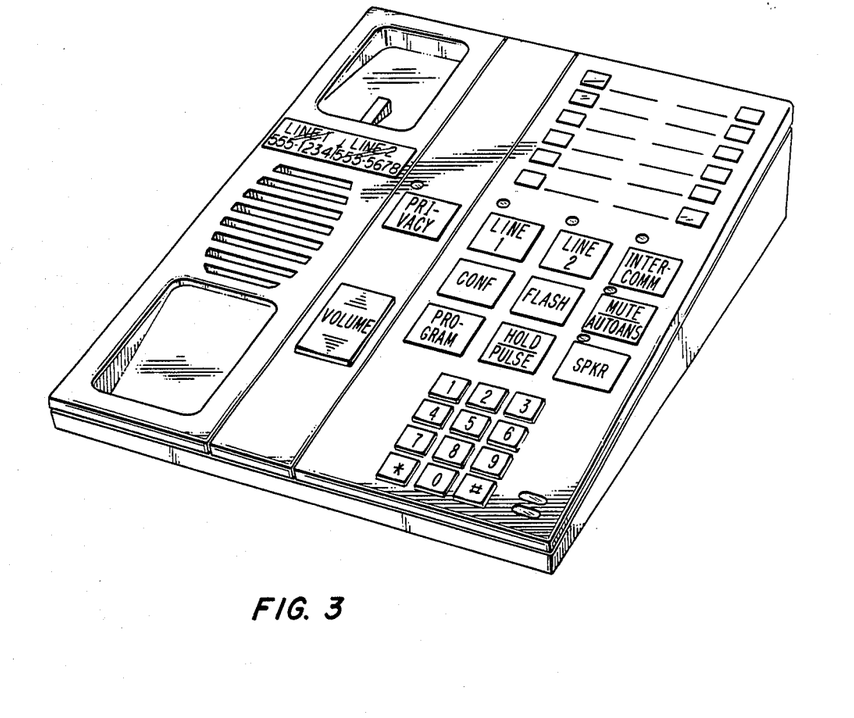
FIG. 3 is a drawing of the base for a master or remote station illustrating various features and functions that are available.

Light Emitting Diodes (LED), collectively designated 165, are illuminated under the control of controller 160. Indications are variously provided to indicate the status of line 1, line 2, intercom, speaker, hands-free answer during intercon (Auto Answer) mode, privacy mode, program state and backup battery status. The state of the keypad contacts and other switches, collectively designated 166 are periodically sampled by controller 160. The various LEDs and switch contact whose state is controlled or determined by controller 160 are shown in FIG. 3 and include the handset switch in the earpiece cavity of the station.

Power supply 190 includes a wall-mounted transformer and circuitry for providing a regulated and filtered +5 volt supply to controller 160 and other using components. Several sources of +5 volts are provided by this supply, each having various degrees of filtering depending on the using equipment. Two of these sources are backed up with a +9 volt battery and are used in providing a non-interruptible source of power to certain critical areas such as the repertory telephone number memory.

When the station goes off-hook, a "battery test enable" signal is delivered to power supply 190 over lead 191. In response, power supply 190 provides an indication to controller 160 that the battery voltage exceeds (or is less than) a predetermined threshold. When the battery is absent or low, controller 160 causes a particular LED to flash—thereby warning the user that stored telephone numbers and basic telephone service may be lost in the event of a power failure. Another one of leads 192 provides an indication of power failure. During power failure, the PFC lead from the controller causes power to be applied to telephone hybrid 120 only when necessary and thus minimizes battery drain. Components used in controlling the application of power include resistors 121,122 and transistor 123. During normal operation the PFC lead is in its low state and power is constantly supplied to telephone hybrid 120.

Figure 7:
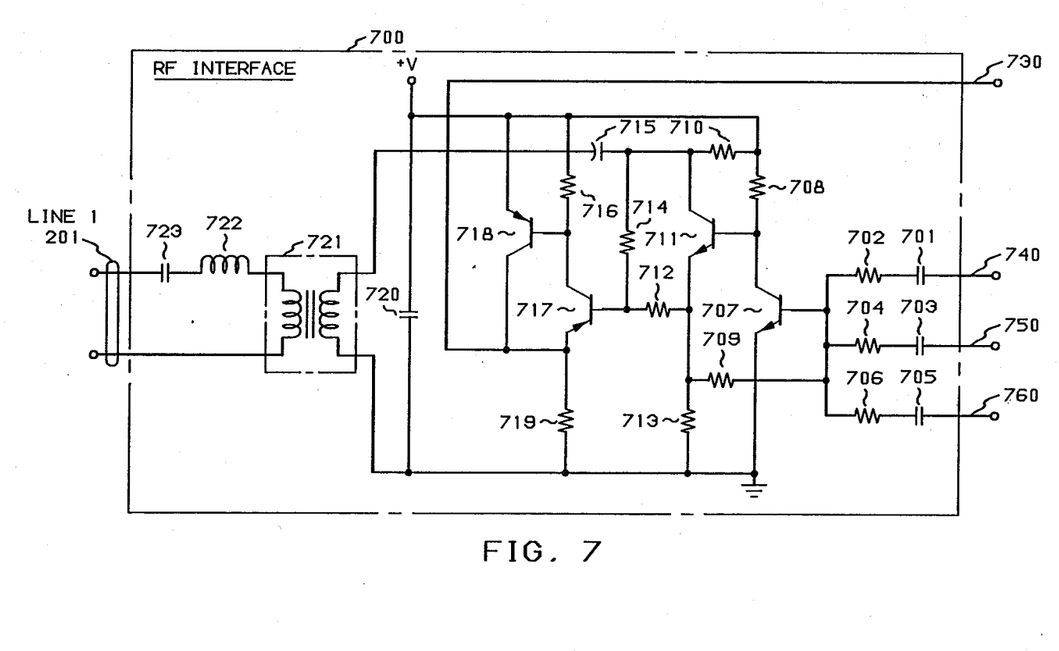
FIG. 7 is a schematic diagram of an RF interface used to interconnect frequency multiplexed signals with the telephone wire-pair.

FIG. 7 discloses a detailed schematic of RF interface 700 of the master station. It performs the function of a hybrid circuit at radio frequencies whereby transmit and receive signals are shuttled to and from Line 1. RF interface 700 receives signals from FM transmitter 571 over lead 740, from FM transmitter 561 over lead 750, and from data transmitter/receiver 510 over lead 760. Each of these RF inputs are additively combined in transistor 707 via components 701–706 with DC removed by capacitors 701, 703 and 705. Feedback resistor 709 in combination with resistors 702, 704 and 706 set the gain of the input stage of interface 700. The signal at the collector of transistor 711 is coupled to the primary of transformer 721 through capacitor 715. Transformers 721 is a 1:1 transformre suitable for operation at the RF frequencies of interest. Capacitor 723 is selected to render the impedance of Line 1 equal to 50 ohms when viewed from the primary of transformer 721. It is noted that RF interface 700 operates as a hybrid at radio frequencies. Inductor 722 and capacitor 723 are tuned for 455 kHz because the data channel transmits and receives at that frequency; so it's more important that the hybrid be balanced at that frequency in order to distinguish transmit and receive signal energy.

Looking into the secondary of transformer 721 from Line 1, capacitor 723 is selected to provide approximately 30 kilohms at 3000 Hz. RF signals present on Line 1 pass through transformer 721, capcitor 715, resistor 714, Darlington pair 717, 718 and finally out lead 730. The magnitude of resistors 712 and 714 are selected to cancel sidetone by combining portions of the inverted and non-inverted outgoing signals present at the emitter and collector terminals of transistor 711.

REMOTE STATION

Figure 8:
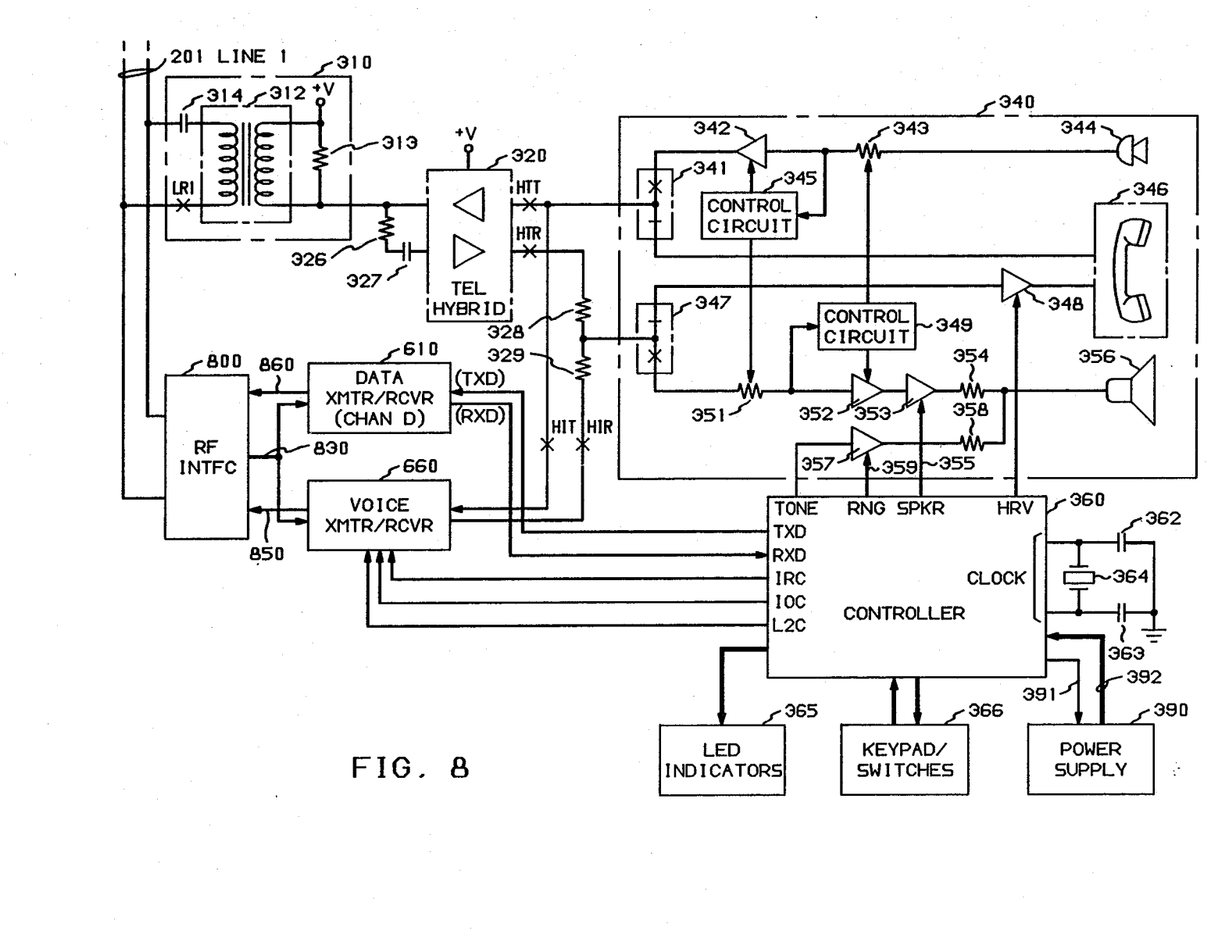
FIG. 8 is and enhanced block diagram of the remote station according to the invention.

Referring now to FIG. 8, wire-pair 201 (Line 1) connects to the remote station through line interface 210 in a parallel electrical connection. Such connections make the Telephone Line Carrier system easily installable by a customer using existing telephone jacks at her premises. Capacitor 314 precludes DC loading when relay LR1 is operated. In order for the remote station to answer an incoming call on wire pair 201 the following events occur. Ringing is detected at the master station which then broadcasts this information to all remote stations via the data channel on wire pair 201. Data transmitter/receiver 610 responds to information in the 455 kHz frequency range, performs amplitude demodulation and delivers the demodulated data over the RXD lead to controller 360. Audible alerting at the remote station is provided when controller 360 delivers a modulated 750 Hz tone to amplifier 357 and hence to loudspeaker 356. One of the group of switched 366 is the switchhook contact, which when activated is sensed by controller 360. In response, relay LR1 (part of interface 310) is operated. Operation of LR1, however, does not cause the telephone call to be answered since capacitor 314 precludes DC flow through the primary of transformer 312. Answering is accomplished at the remote station when controller 360, responsive to the operation of the switchhook, transmits this information over lead TXD to data transmitter/receiver 610 and RF interface 800 to the master station. Upon receiving an indication that the remote station is attempting to answer the telephone call, the master station causes its LR1 relay (part of interface 110) to operate and draw the necessary DC current from the telephone line switching system and thereby answer the incoming call.

Telephone hybrid 320 performs two-wire to four-wire conversion in the voice frequency band identical to telephone hybrid 120 of the master station discussed hereinabove. Contacts HTT and HTR are operated by controller 360 to enable voice communication between handset/speakerphone 340 and wire-pair 201 when the remote station wishes to access Line 1 at voiceband frequencies. Contacts HIT and HIR are operated to enable voice communication between handset/speakerphone 340 and wire-pair 201 when the remote station wishes to access Line 1 at radio frequencies. Controller 360, responsive to the state of keypad/switches 366 and data received from the data channel on input RXD, implements the selection of radio frequency channels at the remote station in accordance with the state of outputs IRC, IOC, and L2C. These outputs are delivered to voice transmitter/receiver 660 which comprises a frequency modulator and a frequency demodulator whose operating frequencies are selectable. The following table sets forth the mutually exclusive states of outputs IRC, IOC, L2C and the corresponding selection of transmit and receive channels:

| CONDITION | TRANSMIT CHANNEL | RECEIVE CHANNEL |
|---|---|---|
| IRC = "1" | IB | IA |
| IOC = "1" | IA | IB |
| L2C = "1" | 2A | 2B |

IRC="1" represents the Control signal whereby the remote station Receives a call on the Intercom channel; IOC="1" represents the Control signal whereby the remote station Originates a call on the Intercom channel; and L2C="1" represents the Control signal whereby the remote station originates or receives a call on Line 2.

Descriptions of other aspects of the remote station shown in FIG. 8 are identical to the corresponding description of the same components in connection with the master station—with the exception that telephone hybrid 320 does not include battery backup. Thus, in the event of power loss, remote stations are inoperative.

What is claimed is:

1. Telephone station apparatus for use at a subscriber's premises, adapted to be parallel connected onto a first wire-pair that extends between said premises and a telephone line switching system, the apparatus including means for transmitting and receiving electrical signals substantially in a frequency band below 4 kHz,

CHARACTERIZED BY:

a first modulator, having input and output ports, responsive to the transmitting means for converting electrical signals at its input port and in the frequency band below 4 kHz into electrical signals in a first frequency band above 4 kHz at its output port;

means interconnecting the output port of the first modulator with the first wire-pair;

a first demodulator, having an input port connected to the first wire-pair, for converting signals at its input port and in a second frequency band above 4 kHz into electrical signals in the frequency band below 4 kHz at an output port thereof;

means interconnecting the output port of the first demodulator with the receiving means;

means responsive to one or more telephone station control signals or status indicators for encoding same into a digital data signal;

a second mdoualtor, having input and output ports, responsive to the digital data signal at its input port for converting same into an electrical signal in a third frequency band above 4 kHz at its output port; and means interconnecting the output port of the second modulator with the first wire-pair, whereby additional channels are added to an existing wire-pair without interference with, or displacement of, voiceband services already present on the wire-pair.

2. The telephone station apparatus of claim 1 wherein said first modulator frequency modulates a carrier signal in the first frequency band in proportion to the magnitude of the electrical signal at its input port, and wherein the first demodulator frequency demodulator electrical signals received at its input port in the second frequency band above 4 kHz.

3. The telephone station apparatus of claim 1 further adapted to terminate a second wire-pair that extends between the subscriber's premises and the telephone line switching system, FURTHER CHARACTERIZED BY switching means, interconnecting electrical signals on the second wire-pair with the input port of the first modulator, and interconnecting electrical signals at the output port of the first demodulator with the second wire-pair, whereby a communication link between the first and second wire-pairs is established.

4. The telephone station apparatus of claim 1 further including a controller interconnected with, and responsive to the electrical state of, a plurality of switch contacts on a front panel of the telephone station apparatus for generating the digital data signal, said digital data signal being encoded to contain an indication of the electrical state of one or more of the switch contacts.

5. The telephone station apparatus of claim 1 wherein said second modulator amplitude modualtes a carrier signal in the third frequency band in accordance with the magnitude of the digital data signal at its input port, said telephone station apparatus further including a second demodulator, having input and output ports, for amplitude demodulating electrical signals in the third frequency band received at its input port, whereby half duplex data communication service is provided.

6. The telephone station apparatus of claim 4 wherein the digital data signal is binary, and the carrier signal of the second modulator is switched off and on in response to the magnitude of the binary signal.

7. The telephone station apparatus of claim 6 wherein the information content of the binary signal is contained in the line duration of each binary pulse.

8. Carrier communication apparatus adapted to be bridged onto a telephone wire-pair, the apparatus including microphone and loudspeaker transducers for converting audible sounds into voiceband electrical signals, a first modulator for converting the voiceband electrical signals from the microphone transducer into a first frequency band above 4 kHz, and a first demodulator for converting modulated signals in a second frequency band above 4 kHz into voiceband electrical signals for interconnection with the loudspeaker transducer,

CHARACTERIZED BY:

hybrid circuit means for interconnecting voiceband signals between the wire-pair and said microphone and loudspeaker transducers;

means responsive to one or more carrier communication apparatus control signals or status indicators for encoding same into digital data signals;

a second demodulator having input and output ports, responsive to the digital data signals at its input port for converting same into electrical signals in a third frequency band above 4 kHz at its output port; and means interconnecting the output port of the second modulator with the wire-pair.

9. The carrier communication apparatus of claim 8 further including a controller interconnected with, and responsive to the electrical state of, a plurality of switch contacts on a front panel of the carrier communication apparatus for generating the digital data signal, said digital data signal being encoded to contain an indication of the electrical state of one or more of said switch contacts.

10. The carrier communication apparatus of claim 8 wherein said first modulator frequency modulates a carrier signal in accordance with the magnitude of the voiceband electrical signals from the microphone, and wherein the first demodulator frequency demodulates electrical signals in the second frequency band, whereby frequency modulation and demodulation provide high quality, full duplex voice communications.

11. The carrier communication apparatus of claim 8, further adapted to terminate a second wire-pair that extends from the apparatus to a telephone line switching system, further characterized by switching means interconnecting electrical signals on the second wire-pair with the input port of the first modulator and interconnecting electrical signals at the output port of the first demodulator with the second wire-pair.

12. The carrier communication apparatus of claim 8 wherein said second modulator amplitude modulates a carrier signal in accordance with the magnitude of the digital data signal at its input, said carrier communication apparatus further including a second demodulator, having input and output ports, for amplitude demodulating electrical signals in the third frequency band received at its input port, whereby half duplex data communication service is provided.

13. The carrier communication apparatus of claim 12 wherein the digital data signal is binary and the carrier signal of the second modulator is switched off and on in accordance with the magnitude of the binary signal.

14. The carrier communication apparatus of claim 12 wherein the information content of the binary signal is contained in the time duration of each binary pulse.

15. A telephone line carrier system for communication at a user's location comprising a master station and one or more remote stations, each station being parallel connected to a wire-pair that extents from the user's location to a telephone line switching system, each station including a microphone, a loudspeaker and a hybrid circuit for interconnecting voiceband signals between the wire-pair and the microphone and loudspeaker, CHARACTERIZED IN THAT
the master station further includes:
a first modulator, responsive to audio frequency signals at an output of the microphone for modulating said output signals into a first frequency band;
a demodulator, responsive to modulated signals on the wire-pair in a second frequency band, for converting same into audio frequency signals;
channel selecting means including one or more switch contacts on the master station for selecting a particular frequency band for interconnection between the wire-pair and the microphone and loudspeaker;
transmitter switching means having a pair of input ports for receiving audio frequency signals from the microphone and for receiving modulated signals from the first modulator, said transmitter switching means being responsive to the selecting means for switching signals to an output port thereof;
a second modulator, interconnected with the wire-pair, responsive to one or more master station control signals or status indicators, for encoding same into a digital data signal and for modulating the digital data signal into a third frequency band;
receiver switching means having a pair of input ports for receiving audio frequency signals from the wire-pair and for receiving demodulated signals from the demodulator, said receiver switching means being responsive to the channel selecting means for switching signals from an input port thereof to the loudspeaker, and
the remote station further includes;
a modulator, responsive to audio frequency signals at an output of the microphone for modulating said output signals into the second frequency band;
a first demodulator, responsive to modulated signals on the wire-pair in the first frequency band, for converting same into audio frequency signals;
channel selecting means comprising one or more switch contacts on the remote station for selecting a particular frequency band for interconnection between the wire-pair and the microphone and loudspeaker;
transmitter swtiching means having a pair of input ports for receiving audio frequency signals from the microphone and for receiving modulated signals from the modulator, said transmitter switching means being responsive to the selecting means for switching signals to an output port thereo;
a second demodulator, interconnected with the wire-pair, for demodulating said digital data signal in the third frequency band; and
receiver switching means having a pair of input ports for receiving audio frequency signals from the wire-pair and for receiving demodulated signals from the first demodulator, said receiver switching means being responsive to the channel selecting means for switching signals from an input port thereof to the loudspeaker.

16. A frequency-division multiplexed communication system for use at a telephone subscriber's location comprising a master station and one or more remote stations, the master station being electrically connected to a central switching system with a wire-pair, each station including a microphone and loudspeaker for converting between audible sounds and electrical signals, a first modulator for frequency shifting voiceband electrical signals from the microphone into a first frequency band above 4 kHz, and a first demodulator for frequency shifting modulated signals in a second frequency band above 4 kHz into voiceband electrical signals for interconnection with the loudspeaker, CHARACTERIZED IN THAT
each station is adapted to be electrically connected to the wire-pair in parallel, and each station further includes:
hybrid circuit means for interconnecting voiceband signals between the wire-pair and said microphone and loudspeaker;
means responsive to one or more station control signals or status indicators for encoding same into digital data signals;
a second modulator having input and output ports, responsive to the digital data signals at its input port for frequency shifting same into electrical signals in a third frequency band above 4 kHz at its output port;
means interconnecting the output port of the second modulator with the wire-pair;
a second demodulator, having input and output ports, for frequency shifting electrical signals in the third frequency band received at its input port; and
means interconnecting the input port of the second demodulator with the wire-pair.

17. A telephone line carrier system for installation at a subscriber's location and interconnection with first and second telephone lines that extend from the subscriber's location to a central switching location, the carrier system operating to distribute signals over the first elephone line, the carrier system including a master station and one or more remote stations bridged onto the first telephone line in a parallel electrical connection, each station including a hybrid circuit for interconnecting voiceband electrical signals between the first telephone line and a microphone and a loudspeaker, CHARACTERIZED IN THAT
the master station termiantes the second telephone line and modulates voiceband signals therefrom onto the first telephone line for access by said one or more remote stations;
at the master station;
a modulator, having input and output ports, for converting voiceband electrical signals at its input port into electrical signals in a first frequency band above voiceband at its output port;
means interconnecting the input port of the modulator with the second telephone line;

means interconnecting the output port of the modulator with the first telephone line;
a demodulator, having input and output ports, for converting electrical signals at its input port in a second frequency band above voiceband into voiceband electrical signals at its output port;
means interconnecting the input port of the demodulator with the first telephone line; and
means interconnecting the output port of the demodulator with the second telephone line;
at the remote station;
a modulator, having input and output ports, for converting voiceband electrical signals at its input port into electrical signals in a second frequency band above voiceband its output port;
means interconnecting the input port of the modulator with the microphone, said microphone converrting audible sounds into voiceband electrical signals;
means interconnecting the output port of the modulator with the first telephone line;
a demodulator, having input and output ports, for converting electrical signals at its input port in the first frequency band above voiceband into voiceband electrical signals at its output port;
means interconnecting the input port of the demodulator with the first telephone line; and
means interconnecting the output port of the demodulator with a loudspeaker, said loudspeaker converting voiceband electrical signals into audible sounds.

18. Telephone station apparatus for use at a subscriber's premises adapted to be parallel connected onto a first wire-pair and terminate a second wire-pair, said first and second wire-pairs extending between the subscriber's premises and a telephone line switching system, the apparatus including means for transmitting and receiving electrical signals substantially in a frequency band below 4 kHz,
CHARACTERIZED BY:
a multiplexer, having an output port connected to the first wire-pair and a plurality of input ports, for converting electrical signals in the frequency band below 4 kHz at an input port thereof into electrical signals in a first frequency band above 4 kHz at its output port;
a demultiplexer, having an input port connected to the first wire-pair and having a plurality of output ports, for converting signals in a second frequency band above 4 kHz at its input port into electrical signals in the frequency band below 4 kHz at an output port thereof;
switching means interconnecting electrical signals on the second wirepair with one of the input ports of the multiplexer, and interconnecting electrical signals at one of the output ports of the demultiplexer with the second wire-pair; and
means interconnecting a digital data signal between a processor and another of the input ports of the multiplexer for converting same into an electrical signal in a third frequency band above 4 kHz at its output port, whereby a link between the first and second wire-pairs and a data channel for communication control over the first wire-pair is established.

19. Carrier communication apparatus adapted to be bridged onto a first wire-pair, the apparatus including microphone and loudspeaker transducers for converting audible sounds into voiceband electrical signals, a first modulator for converting the voiceband electrical signals from the microphone transducer into a first frequency band above 4 kHz, and a first demodulator for converting modulated signals in a second frequency band above 4 kHz into voiceband electrical signals for interconnection with the loudspeaker transducer;
CHARACTERIZED BY:
first hybrid circuit means interconnecting voiceband signals between the first wire-pair and said microphone and loudspeaker transducers;
second hybrid circuit means terminating a second wire-pair that extends from the apparatus to a telephone line switching system;
a second modulator having input and output ports for converting voiceband electrical signals into a third frequency band above 4 kHz, the output port being connected to the first wire-pair;
a second demodulator having input and output ports for converting modulated signals in a fourth frequency band above 4 kHz into voiceband electrical signals, the input port being connected to the first wire-pair;
means interconnecting signals received from the second wire-pair with the input port of the second modulator, and interconnecting signals to be transmitted over the second wire-pair with the output port of the second demodulator; and
a third demodulator having input and output ports, responsive to digital data signals at its input port for converting same into electrical signals in a fifth frequency band above 4 kHz at its output port, the output port of the third modulator being connected to the first wire-pair.

* * * * *